(12) United States Patent
Humcke et al.

(10) Patent No.: US 7,237,375 B2
(45) Date of Patent: Jul. 3, 2007

(54) INVESTMENT CAST, STAINLESS STEEL CHAIN LINK AND CASTING PROCESS THEREFOR

(76) Inventors: Michael W. Humcke, W278 N2968 Rocky Point Rd., Pewaukee, WI (US) 53072; Anthony D. Krallman, 14438 Langhill Dr., Hacienda Heights, CA (US) 91745

( * ) Notice: Subject to any disclaimer, the term of this patent is extended or adjusted under 35 U.S.C. 154(b) by 0 days.

(21) Appl. No.: 11/648,966

(22) Filed: Jan. 3, 2007

(65) Prior Publication Data

US 2007/0107412 A1    May 17, 2007

Related U.S. Application Data

(62) Division of application No. 10/976,128, filed on Oct. 28, 2004.

(51) Int. Cl.
*F16G 13/06* (2006.01)
*B22C 9/04* (2006.01)
*B23P 19/02* (2006.01)

(52) U.S. Cl. ............... 59/35.1; 59/78; 164/26; 164/34; 164/351

(58) Field of Classification Search ........ 59/5, 59/8, 35.1, 78, 84; 164/26, 351, 516, 7.1, 164/34, 35
See application file for complete search history.

(56) References Cited

U.S. PATENT DOCUMENTS

| | | | |
|---|---|---|---|
| 404,460 A | 6/1889 | Akerson | |
| 630,169 A | 8/1899 | Black | |
| 809,511 A | 1/1906 | Lien | |
| 1,079,476 A | 11/1913 | Deakins | |
| 1,504,646 A | 8/1924 | Roddy | |
| 1,731,393 A | 10/1929 | Paradise | |
| 2,412,364 A | 12/1946 | Sivyer | |
| 2,606,348 A * | 8/1952 | Ronceray | 164/351 |
| 3,748,919 A | 7/1973 | Cook et al. | |
| 4,019,559 A * | 4/1977 | Szabo | 164/518 |
| 4,123,947 A | 11/1978 | Smith et al. | |
| 4,160,313 A * | 7/1979 | Radford | 29/525 |
| 4,220,052 A | 9/1980 | Sheldon | |
| 4,602,667 A * | 7/1986 | Moore et al. | 164/7.1 |
| 4,667,813 A | 5/1987 | Densmore | |
| 4,682,687 A | 7/1987 | Leege et al. | |
| 4,744,211 A | 5/1988 | Abe | |
| 4,863,418 A | 9/1989 | Fillar et al. | |
| 4,940,072 A * | 7/1990 | Pellman et al. | 164/35 |
| 5,269,729 A | 12/1993 | Thuerman et al. | |
| 5,286,130 A | 2/1994 | Mueller | |
| 5,369,833 A | 12/1994 | Uttke et al. | |
| 5,950,416 A * | 9/1999 | Kerner et al. | 59/78 |
| 6,666,327 B2 | 12/2003 | Kilby et al. | |
| 6,749,006 B1 * | 6/2004 | Yang et al. | 164/516 |

* cited by examiner

FOREIGN PATENT DOCUMENTS

CH         264675    *  2/1950

*Primary Examiner*—David Jones
(74) *Attorney, Agent, or Firm*—Andrus, Sceales, Starke & Sawall, LLP (57) ABSTRACT

An investment cast, stainless steel chain link is provided for chains used in water and wastewater treatment. The chain link comprises a pair of spaced apart, elongated sidebars having forward ends and rearward ends. The forward ends are spread apart and are provided with outwardly and laterally extending bosses having transverse boss pin bores coaxially aligned with each other. The rearward ends are interconnected by a cylindrical barrel having a barrel pin bore extending through each of the sidebars. The sidebars are formed with outwardly and laterally projecting reinforcing ribs extending between the bosses and the barrel pin bore along a substantial length of the sidebars. A freely rotatable chain pin is inserted through aligned boss and barrel pin bores from either end thereof for interconnecting first and second pairs of sidebars. An arrangement is provided for preventing the lateral dislodgement of the chain pin from the sidebars.

10 Claims, 8 Drawing Sheets

INVESTMENT CAST, STAINLESS STEEL CHAIN LINK AND CASTING PROCESS THEREFOR

CROSS-REFERENCE TO RELATED APPLICATIONS

The present application is a divisional of co-pending U.S. patent application Ser. No. 10/976,128, filed Oct. 28, 2004, which application is currently pending.

FIELD OF THE INVENTION

The present invention relates generally to chain constructions employed in water and wastewater conveyor type treatment systems and, more particularly, pertains to a stainless steel chain link produced in an investment casting process.

BACKGROUND OF THE INVENTION

Sludge, waste solids and scum collector mechanisms are commonly used in wastewater treatment tanks to remove debris and settled sludge from the bottom of collection tanks, to skim the floating grease and solids from the surface of collection tanks, and for removing grit and trash from wastewater and process streams. Typically, such collector and conveyor mechanisms include a pair of spaced apart continuously articulating chains trained over collector chain sprockets which are mounted on cross shafts supported on the sidewalls of the tank or equipment, and elongated transverse collector flights, scrapers and skimmers supported between the chains. One of the sprockets is driven so that the chain loops revolve to provide a succession of collector flights along a bottom of the mechanism as well as along the surface of the water in the mechanism basin to accomplish the collection, conveying, and skimming functions. Successive collector flights push and discharge scum, sludge and debris into collection areas of the tank or mechanism for removal.

Series 700 chains have been one of the process equipment mainstays in the municipal and industrial water and wastewater treatment industry since the early 1900s. The Series 700 chain is used extensively in process waste solids and bio-solids removal equipment including rectangular chain and scraper sedimentation clarifiers, storm water collectors and clarifiers for grit, sand and debris removal in chain and flight grit collectors, chain and bucket grit collectors, grit elevators, and grit clarifiers, and for screening and removal of suspended debris, trash and rags in bar screens and trash rakes.

Until the early 1970s, Series 700 chain was only available in cast or fabricated steel. While this chain has a high initial ultimate strength and application working load (42,000 pounds and 4,200 pounds respectively), the chain suffers from rapid wear and loss of strength primarily from oxidation of the link material, chemical and biological induced corrosion, abrasive wear from contact with iron oxide fines (from corrosion within the chain link components), and from contact with grit and silica fines in the process streams. The average surface life for most equipment applications is seven years or less.

In 1975, Rexnord Corporation of Milwaukee, Wis. introduced the first plastic series 700 Series chain molded from acetal plastic to eliminate the rapid wear caused by corrosion and oxidation. While the plastic chain provides excellent service in most lightly loaded chain and scraper collection equipment and clarifiers, the chain has significant limitations with regard to ultimate strength and working load (6,000 pounds and 2,500 pounds respectively). This often limits effective service for CS (chain and scraper) collector equipment applications 250 feet or less in length.

All plastic chain and plastic chain pin materials have little abrasion resistance which renders standard plastic chains vulnerable to severe abrasive attack, and makes them generally unsuitable for sustained grit collector service. In some cases, the lack of abrasion resistance can also make plastic chain unsuitable for sustained cross collector service in rectangular collectors. In addition, the higher load requirements for grit collectors and screening equipment are often well above the rated working load of this chain, and may even exceed the ultimate strength of the plastic chain causing frequent service outages and catastrophic equipment failures.

Plastic materials are susceptible to attack from ultraviolet radiation and sunlight, can become brittle in severe cold, and have a high coefficient of expansion and contraction due to seasonal air temperature variations, and variable ambient water temperature. This makes the standard plastic chain generally unsuitable for applications where they are frequently exposed to the atmosphere, in other non-submerged applications such as storm water collectors, or in other applications with high temperature, or very high (caustic) or very low (acid) chemical pH concentrations.

As an alternate to plastic chain, and for corrosives applications with high working loads and temperature, some manufacturers developed welded or fabricated Series 700 chain link design, sometimes manufactured from grade 300 or 400 stainless steel bars, rounds and/or plate, in an attempt to reduce the effects of corrosion, and to a lesser extent, the effects of abrasion.

While fabricated stainless steel chains can approach the ultimate strength and working load of conventional cast chains, such designs, depending on the grade of stainless steel used, they have significant strength and working load limitations. Chain manufactured from 400 stainless steel, while more corrosion resistant than conventional cast steel chain, has a much lower corrosion resistance and strength than a cast 316 stainless steel link, even when the 400 stainless steel link is heat treated. Unlike 316 stainless steel alloys, grade 400 stainless steels undergo corrosive attack when exposed to a variety of acids, alkalis, chlorides and sulfide compounds, and gases commonly found in water and wastewater treatment.

All welded chain experiences carburization of the link material at the weldments, which results in stress risers and embrittlement of the link material. These factors contribute to stress fractures of the link material, and limit the ultimate strength and working load capacity of the these chains.

Welded and fabricated chains are labor intensive to manufacture which often increases the cost to the consumer beyond the point that it is cost effective when compared to conventional cast chain. To compensate for the additional cost of manufacturing, some fabricated chain designs utilize smaller chain pin diameters, thinner length sidebars, and less expensive materials. These result in reducing the ultimate strength, working load and service life of the chain.

From the beginning of chain link design, conventional steel chain designs have had non-rotating chain pins that are mechanically locked into the chain sidebars by means of a T-head shaped chain pin, or by using a riveted "HEAD" chain pin that is tightly press fit in place. These conventional chain pins often have flat or tapered ends machined into the opposite end of the chain pin which further locks the chain pin in place with the opposite chain sidebar. The chain pin cannot be installed from the opposite direction. On all other conventional chain designs, both the riveted head and T-head end of the chain pin and the opposite (cottered) end of the chain pin have an interference fit, and must be pressed into the chain sidebars by mechanical means. This requires the use of substantial mechanical force for inserting the pin, and some mechanical method for preventing the sidebars from bending and spreading as the chain pin is forced into the sidebars. This often requires the use of two people to complete this assembly task. Locking of the chain pin causes the load and wear to always be concentrated only on one side of the chain pin outside diameter and only on one side of the chain pin inside diameter as the chains articulate around sprockets. Since the chain pin is fixed in place, none of the rotating wear is distributed to the chain pin bosses at the open end of the link. The concentration of wear and load to reduced surface areas causes accelerated and one-sided premature failure of the chain pin outer diameter and the chain link barrel inner diameter.

In order to eliminate the corrosion and wear problems, and all of the other most common problems associated with conventional sand-cast, fabricated and plastic Series 700 chain in the water and wastewater industry, it is desirable to provide a unique investment cast stainless steel 720S chain link. The new chain meets and exceeds all current standards for Series 700 class welded steel chain, cast chain and attachments as established for the water and wastewater industry per American National Standard ASME B29.21M-1996.

Although investment casting has been alluded to in previous patents for other cast chain designs, this manufacturing process, especially as it relates to the use of stainless steel alloys, has never been perfected and used previously. Casting stainless steel is significantly different from casting conventional steel alloys.

The investment casting process does not readily release, disperse or diffuse the heat of the molten metal through the mold media, unlike the coarse grain sand used in the conventional sand casting process. Prior to the development of the present invention, no one has been able to control the variables of the investment casting process to achieve both high uniform strength and close dimensional tolerances required for the offset sidebar Series 700 chain link. Significant heat concentrations from the casting process must be dispersed from the chain link sidebars, and the round pin bosses at both the pin boss (open end) and the chain barrel (closed end).

It is further desirable to provide an investment casting process for stainless steel alloys that eliminates the heat concentrations and the formation of stress risers within and about the chain sidebars, the chain boss (open end of the link) and the chain barrel (closed end of the link), and that eliminates shrinkage and dimensional variations within and between the holes for the chain pin. It is also desirable to provide an investment casting process that holds the dimensional tolerances between the open end and the closed end pin holes within each link to within +/−0.010 inches, exceeding the +/−0.018 inches dimensional American engineering standard allowed for conventional sand cast steel chains.

In the formation of the chain link, molten stainless steel must be delivered into the mold in a rapid and uniform manner to assure uniform isotropic grain structure throughout the casting. The unidirectional flow pattern of the mold design also assures a linear (not transverse) grain structure parallel to the depth of the chain sidebar. In addition, the link must be cooled slowly and uniformly to prevent carburization and the formation of stress risers within the link, and to prevent the link from warping during the cooling stage. The link must also be cooled slowly and uniformly to prevent shrinkage of the link material that would compromise the close tolerances required between the link components.

It is additionally desirable to provide an investment casting mold structure which will overcome the aforementioned problems encountered in casting single or multiple chain links.

SUMMARY OF THE INVENTION

It is a general object of the present invention to provide an improved investment cast stainless steel chain link designed particularly for severe and extreme duty corrosive, abrasive and high working load application for use in water and wastewater treatment systems.

It is one object of the present invention to provide an investment cast stainless steel chain link having a lateral reinforcing rib running substantially the full length of the each chain link sidebar, and a rotating chain pin with a non-locking chain pin head.

It is also an object of the present invention to provide an investment cast stainless steel chain link having a close grain isotropic structure which results in higher ultimate pull strengths, and eliminates most of the corrosive and corrosive-abrasive wear as the chain engages the sprocket teeth that drive, guide and carry the chain.

It is another object of the present invention to provide an investment cast stainless steel chain link offering precise and uniform dimensional tolerances in each and every link.

It is a further object of the present invention to provide an investment cast stainless steel chain link which eliminates the carburization and corrosive attack present in prior art welded chain links, as well as the presence of stress risers commonly present in welded and fabricated chain link designs.

It is an additional object of the present invention to provide an investment cast chain link fabricated from various stainless steel alloys offering superior corrosive resistance to all major chemical, and biological elements and compounds found in water and wastewater, including thermal variations.

It is still another object of the present invention to provide an investment casting process for a stainless steel chain link which uses a fine grain ceramic media for the mold that does not readily permit diffusion of heat through the mold material.

A further object of the present invention is to provide an investment casting process for a stainless steel chain link which employs heat dispersing elements within the mold to prevent heat concentrations and formation of stress risers within and about the chain boss and the chain barrel, and to eliminate shrinkage and dimensional variations within and between the chain pin holes.

Yet another object of the present invention is to provide an investment casting process for a stainless steel chain link which allows for casting multiple chain links at one time, and which permits the more efficient manufacture of attachment links.

Still a further object of the present invention is to provide an investment cast stainless steel chain link which is substantially less expensive to maintain and operate over a 20 year service cycle than other chain links previously used in wastewater and wastewater treatment.

In one aspect of the invention, an investment cast, stainless steel chain link is provided for chains used in water and wastewater treatment. The chain link includes a pair of spaced apart, elongated sidebars having forward ends and rearward ends. The forward ends are spaced apart and are provided with outwardly and laterally extending bosses having transverse boss pin bores coaxially aligned with each other. The rearward ends are interconnected by a cylindrical barrel having a barrel pin bore extending through each of the sidebars. The sidebars are formed with outwardly and laterally projecting reinforcing ribs extending between the bosses and the barrel pin bore along a substantial length of the sidebars. The interconnected rearward ends of a first pair of sidebars are disposed between the separated forward ends of a second pair of sidebars such that the barrel pin bore is coaxially aligned with the boss pin bores. A chain pin is insertable through the aligned boss and barrel pin bores for interconnecting the first and second pairs of sidebars, the chain pin being freely rotatable relative to the sidebars. An arrangement is provided for preventing the lateral dislodgement of the chain pin from the sidebars.

The sidebars have upper and lower linear edges which are generally parallel to each other. The rearward ends of the sidebars are generally parallel to each other and the forward ends of the sidebars diverge away, or are offset from each other. The forward ends of the sidebars are provided with outwardly and laterally extending circular bosses. The bosses have external surfaces which are flat, smooth and uninterrupted. The reinforcing ribs have longitudinal axes which run generally parallel to the upper and lower edges of the sidebars. The sidebars of the reinforcing ribs form T-shaped cross sections. Surfaces of the sidebars coextensive with the barrel are offset inwardly from the external surfaces of the bosses. The chain pin has an elongated cylindrical shaft portion having, at one end, a smooth cylindrical flat head and, at an opposite end, a throughhole. The arrangement for preventing lateral dislodgment of the chain pin is a cotter pin in the throughhole. The head of the chain pin rotates freely relative to one of the boss external surfaces. A flight supporting portion may project integrally from the chain link.

In another aspect of the invention, a method is provided for investment casting of chain links. The method includes the steps of providing a metal die having a cavity defining a chain link formed therein; injecting wax into the chain link cavity of the metal die to form a wax pattern having a pair of hollow cores that form pin bores in the chain link to be cast; assembling a plurality of wax patterns on a feeder system; sequentially forming an investment on each wax pattern on the feeder system at least three times; masking the hollow cores with a combustible heat disbursing element to prevent further investment buildup on inside surfaces of the hollow cores; further sequentially forming investment on each wax pattern to form a ceramic shell around each wax pattern; placing the ceramic-coated wax pattern in a steam chamber to melt and eliminate the wax and form ceramic molds; heating and curing the ceramic molds in an oven while burning away and removing the heat disbursing elements from the hollow cores; pouring molten stainless steel alloy into the heated and cured ceramic molds; cooling the ceramic molds to solidify the stainless steel alloy therein; breaking away the ceramic molds to leave a series of castings defining stainless steel chain links; and cutting, grinding and finishing the castings to form completed chain links.

The step of providing the metal die includes the step of providing aluminum cores. The step of injecting wax includes the step of removing the aluminum cores. As an alternate, a preformed hollow ceramic core can be placed into the aluminum mold in place of the aluminum cores. This process continues injecting wax around the ceramic preformed hollow core and then removes the wax pattern with the preformed ceramic core from the metal die. The hollow ends of the preformed hollow ceramic are masked off before forming the ceramic mold. All subsequent process steps will remain the same. The step of forming investment includes dipping and draining each wax pattern in a colloidal silica slurry and then dusting each wax pattern with a fine silica sand. The heat disbursing element is preferably wax. The step of heating and curing the ceramic molds is performed at a temperature of at least 1,800 degrees F. The temperature of the molten stainless steel alloy is about 2,850–3,000 degrees F. The stainless steel alloy is formed of the following composition in weight (%) chromium 16%, nickel 12%, manganese 2%, molybdenum 2%, silicon 0.75%, copper 0.5%, carbon 0.08%, phosphorous 0.04%, sulfur 0.08%, and iron for the balance. The step in providing a metal die includes the step of forming the chain link cavity with a gate on one end in communication with a pair of elongated flow channels running substantially along a length of the chain link sidebars to be cast on opposite sides thereof.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
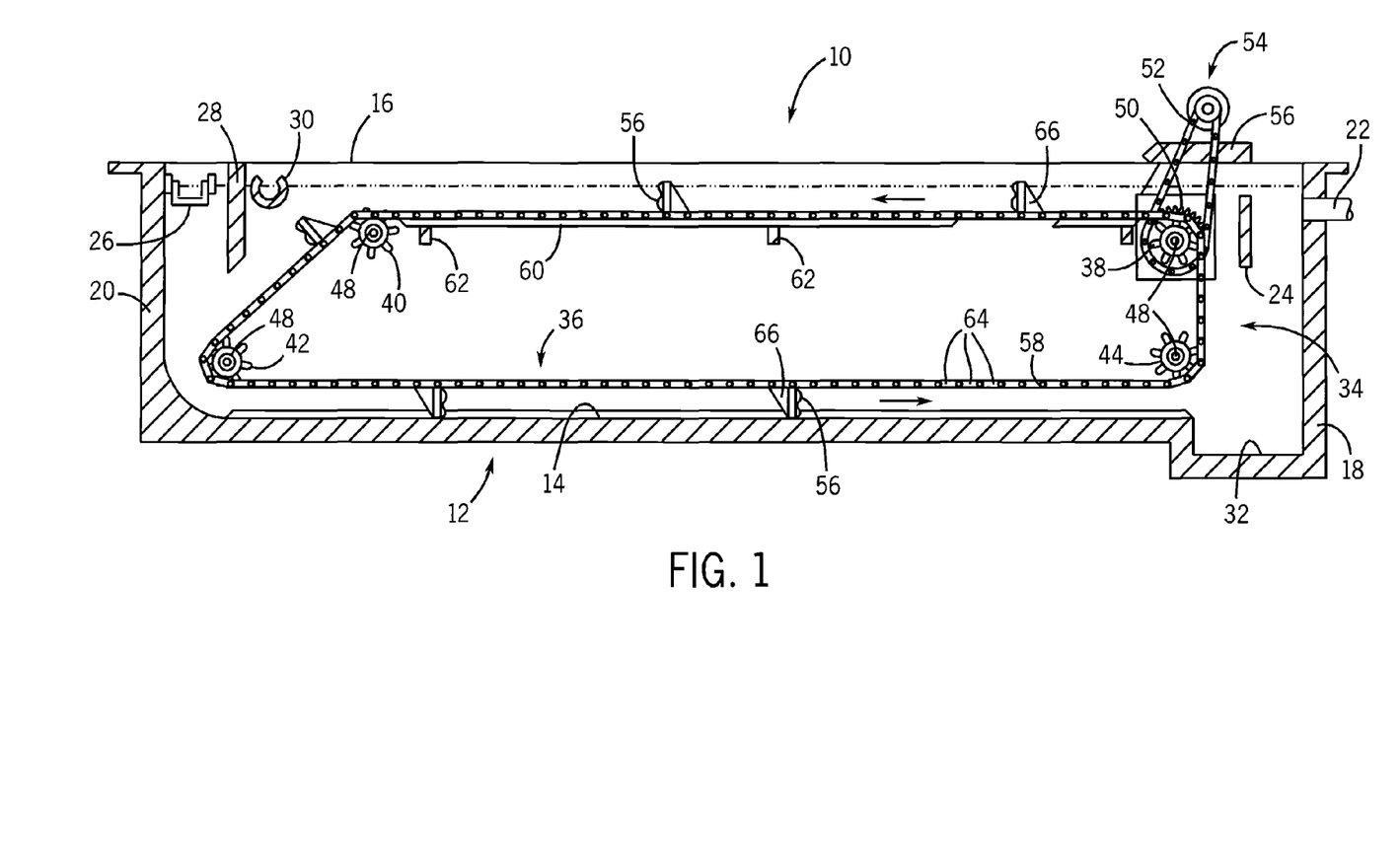
FIG. 1 is a sectional view of a wastewater treatment tank including collector chains embodying investment cast, stainless steel chain links of the present invention.

Illustrated in FIG. 1 is one type of a sediment removal or wastewater treatment apparatus 10 which embodies the chain construction of the invention, and which functions to remove waste material such as settlable solids or sludge, grit, trash, debris and floatable waste or scums from wastewater, although other liquids could be treated.

The wastewater treatment apparatus 10 includes a primary sedimentation or settling tank 12 which is usually formed with reinforced concrete or steel. The tank 12 includes a bottom 14, a pair of opposite sidewalls 16 (one is shown), an influent endwall 18, and an effluent end wall 20, which together defines the tank 12. A conduit 22 extends through the influent endwall 18 for delivering wastewater into the tank 12. A first baffle 24 extends across the top of the tank 12, between the sidewalls 16 and downwardly in front of and somewhat below the conduit 22 to minimize the movement and turbulance created by the influent flow to less than 1 foot per minute. The wastewater flows steadily through the tank 12 from the influent endwall 18 to the effluent endwall 20 where one or more box weirs 26 (one is shown) are located to provide transverse channels for the flow of wastewater out of the tank 12. A second baffle 28 extends across the tank 12 in a position upstream of the effluent endwall 20 to permit floating waste from floating downstream to the weir 26. The tank 12 is also provided with scum and sludge collection troughs 30 and 32, respectively, positioned upstream of the second baffle 28 and adjacent the influent endwall 18 for the eventual removal of wastes from the tank 12.

As the wastewater flows through the tank 12, the sludge descends to the bottom 14 while the scum floats to the surface of the wastewater. Accordingly, the wastewater treatment apparatus 10 also includes a waste collector mechanism or apparatus 34 supported in the tank 12 for removing the floating and submerged waste.

The collector apparatus 34 includes a pair of endless chains 36 (only one is shown), each located adjacent one of the sidewalls 16 and the construction of which will be more fully explained below. The endless chains 36 are arranged in parallel relation to each other and are trained around pairs of toothed sprockets 38, 40, 42 and 44 which each engage the chains 36 to guide their travel in the tank 12. Each pair of sprockets 38, 40, 42, and 44 is mounted on one of four transversely extending shafts 48, the ends of which are rotatably mounted in bearings (not shown) secured in the sidewalls 16. To rotate the chains 36 within the tank 12, the shaft 48 for the pair of sprockets 38 has a driving sprocket 50 secured thereto and engaged by a driving chain 52 extending downwardly from a power drive unit 54 mounted on a platform 55 above the tank 12. The chains 36 are driven in a counterclockwise direction.

The endless chains 36 serve as carriers for a plurality of elongated collector flights 56 which extend transversely between the chains 36 and at sequential positions along the chains 36. An example of a suitable collector flight is illustrated in U.S. Pat. No. 4,663,042 issued May 5, 1987 to Rasper et al. and the disclosure of this patent is incorporated herein by reference. As the endless chains 36 travel within the tank 12, the flights 56 are guided in a lower run along the bottom 14 to scrape sludge therefrom, and in an upper run along the surface of the wastewater to skim floating waste from the surface.

To guide the flights 56 in the lower run, lower tracks or rails 58 (only one is shown) are embedded in the bottom 14. To support the chains 36 while in the upper run, longitudinally extending upper tracks or rails 60 (only one is shown) are secured along the sidewalls 16 using a pair of spaced apart brackets 62. The upper rails 60 are located at such an elevation that the flights 56 are partially submerged in the wastewater as they ride along the rails 60. During operation of the collector apparatus 34, the revolving chains 36 provide a succession of collector flights 56 in the upper run to skim floating waste from the surface of the wastewater. The floating waste is thereafter received in the scum trough 30 for discharge from the tank 12. The revolving chains 36 also provide a succession of flights 56 in the lower run to scrape the settled sludge from the bottom 14 for deposit into the sludge trough 32. The sludge is pumped from the sludge hopper or trough 32 intermittently or continuously in accordance with the process requirements.

The endless chains 36 of the present invention are preferably identical and are configured of a plurality of adjacently connected chain links 64, as depicted in FIGS. 2–5, according to the present invention. Each chain link 64 is constructed of 720S Series 316 stainless steel alloy from an investment casting process which forms part of the invention to be detailed below.

Figure 3:
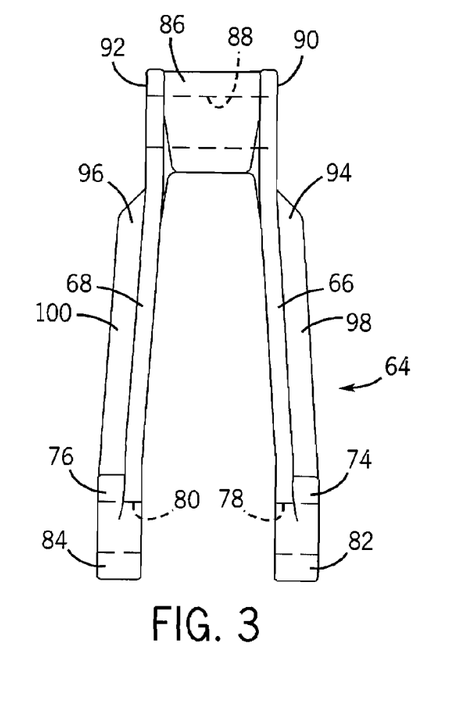
FIG. 3 is a plan view of one of the chain links shown in FIG. 2.

Each chain link 64 includes a pair of elongated, spaced apart, left and right sidebars 66, 68 each having a linear upper edge 70 and a linear lower edge 72 generally parallel to each other. Referring to FIG. 3, the sidebars 66, 68 have rearward portions that are generally parallel to one another, and forward portions which diverge slightly away from each other. Forward or open ends of the sidebars 66, 68 are provided with outwardly and laterally extending, circular bosses 74, 76. The bosses 74, 76 have formed therein respective transversely extending pin bores 78, 80 which are generally coaxially aligned with one another. External surfaces 82, 84 of the bosses 74, 76 are flat, smooth and uninterrupted. Rearward ends of the sidebars 66, 68 are interconnected by a cylindrical barrel 86 having a pin bore 88 extending through each of the sidebars 66, 68. Sidebar surfaces 90, 92 coextensive with barrel 86 are similar to external surfaces 82, 84 but are offset inwardly therefrom as best seen in FIG. 3.

Figure 4:
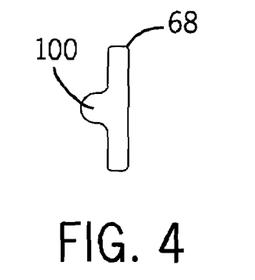
FIG. 4 is a sectional view of the chain link taken on line 4—4 in FIG. 3.
Figure 5:
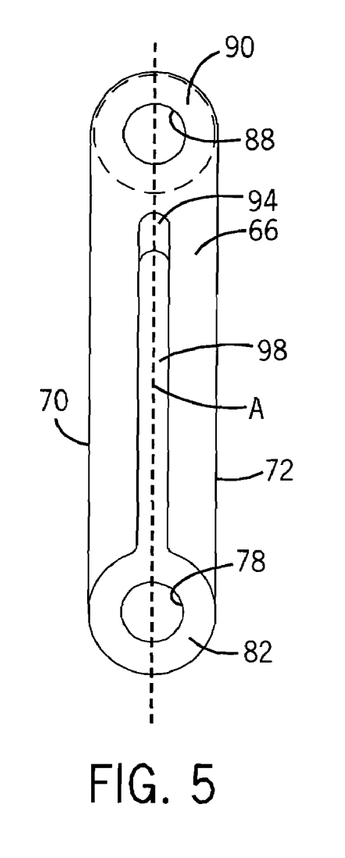
FIG. 5 is a right side elevational view of the chain link of FIG. 3.

It is an important feature of the invention that reinforcing ribs 98, 100 project laterally from sidebars 66, 68 and run substantially continuously along substantially an entire length thereof between bosses 74, 76 and the barrel pin bore 88. Rearward ends 94, 96, respectively, of ribs 98, 100 taper inwardly and blend into outer surfaces of respective sidebars 66, 68 forwardly of barrel pin bore 88 as seen in FIG. 3. As seen in FIG. 5, each rib 98, 100 has a longitudinal axis A which is generally parallel to the upper and lower sidebar edges 70, 72. Referring to FIG. 4, each rib 98, 100 together with its respective sidebar 66, 68 creates a T-shaped section which provides additional mass and uniform cross sectional strength throughout the length of chain link 64. In addition, as will be appreciated hereafter, the unique casted formation of each reinforcing rib 98, 100 provides additional material thickness and eliminates the concentration of stress risers, including transverse grain structure which normally cause premature failure in prior art conventionally cast or fabricated steel chain and stainless steel links. It has been found that the addition of the reinforcing ribs 98, 100 along the substantially full length of the sidebars 66, 68 results in a 50 percent greater ultimate pull strength than all other 720S chain designs.

Figure 2:
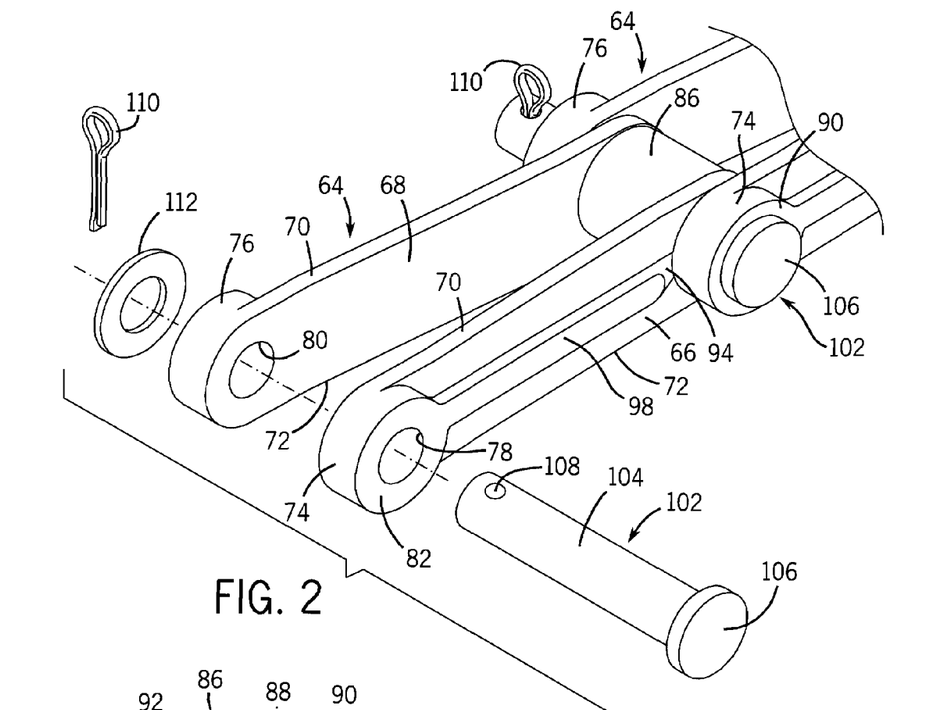
FIG. 2 is a partially exploded, perspective view of a pair of interconnected chain links used in the chains of FIG. 1.
Figure 6:
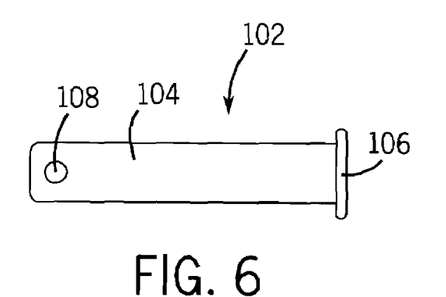
FIG. 6 is an elevational view of the chain pin shown in FIG. 2.
Figure 7:
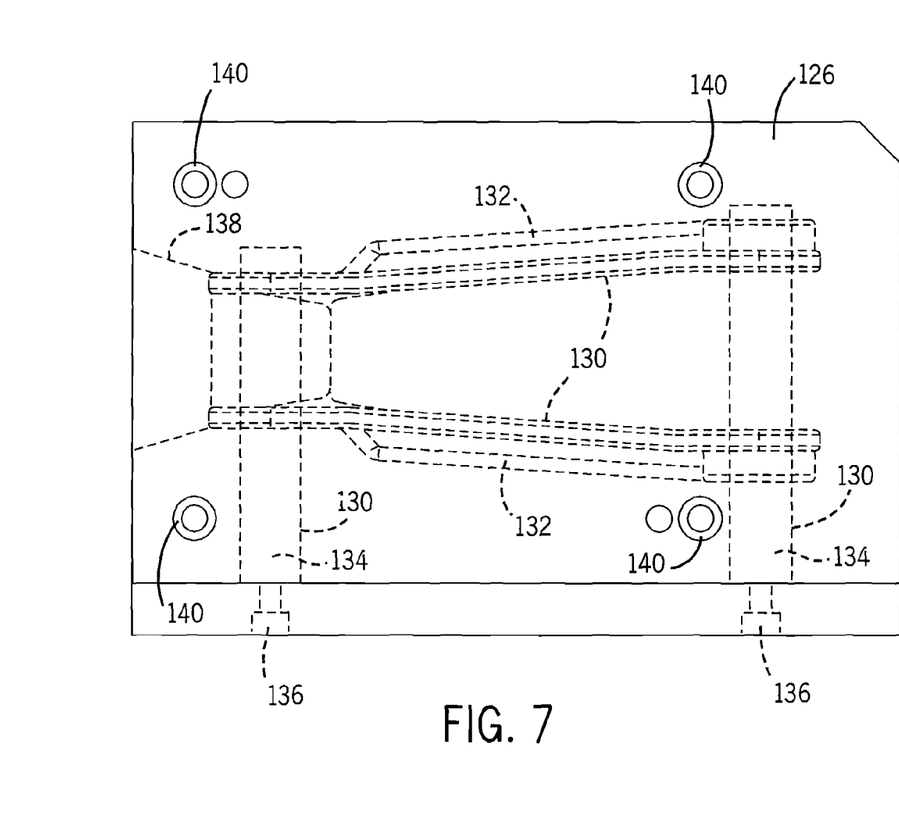
FIG. 7 is a top view of an aluminum die provided with a wax-receiving gate as used in an investment casting of the chain links of FIG. 2.

Each chain 36 also includes a plurality of removable chain pins 102 for interconnecting adjacent chain links 64. As shown in FIGS. 2 and 6, each pin 102 includes an elongated, cylindrical shaft portion 104 having, at one end, a smooth cylindrical flat head 106 and, at an opposite end, a throughhole 108 for receiving a removable cotter pin 110. It is also an important feature of the invention that each pin 102 is freely rotatable and non-locking relative to the chain link 64. That is, each shaft portion 104 will freely rotate in pin bores 78, 80 of bosses 74, 76 as well as pin bores 88 of barrels 86.

Further, the smooth, flat undersides of heads 106 will freely rotate relative to the external surfaces 82, 84 of bosses 74, 76. Each chain link 102 is designed to be inserted into the sidebars 66, 68 without applying mechanical force, and from either side of the chain link 64 by hand and by one person.

To construct chain 36, the forward portions of the sidebars 66, 68 of each chain link 64 are spaced apart to receive therebetween the rearward portions of an adjacent link 64 so that the pin bores 78, 80 of bosses 74, 76 on one link 64 are coaxially aligned with the pin bore 88 of barrel 86 on the adjacent link 64. The shaft portion 104 of chain link 102 is slidably passed through the aligned pin bores 78, 80 from either side of the chain link. The chain link 64 has a length such that its hole end also passes through a washer 112 on the other side of the link 64. The hole 108 will be exposed on the other side of the chain link 64 outside washer 112 after which cotter pin 110 is inserted through the hole 108 to prevent the pin 102 from being dislodged from the joined links 64. The pin 102 remains freely rotatable relative to each pair of connected links 64. Subsequent links 64 are connected in a similar fashion.

Figure 11:
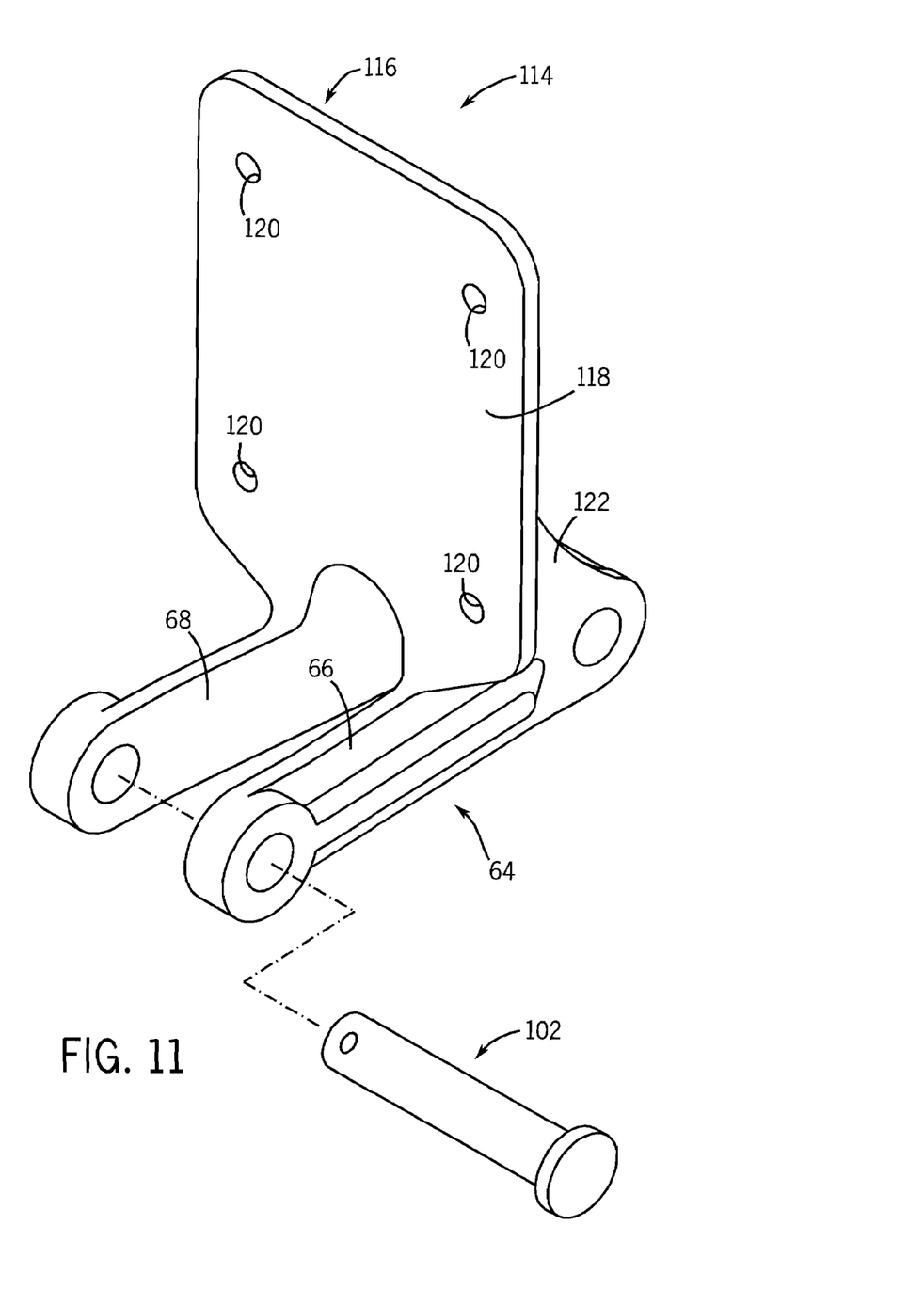
FIG. 11 is a perspective view of an attachment link capable of being made by the casting process.

Each of the chains 36 in FIG. 1 also include a series of flat attachment links 114 positioned at spaced intervals in the chain for supporting the flights 56. While the attachment links 114 may be variously configured, a typical attachment link configuration is illustrated in FIG. 11. The attachment link 114 is investment cast in the same type of process as chain link 64, and includes a unitized combination of chain link 64 along with the flight support portion 116 projecting upwardly from the link 64. The flight support portion 116 has a pusher or paddle plate 118 located on the rearward portion of link 64 and positioned above and transversely to the sidebars 66, 68. The forwardly facing surface of the paddle plate 118 defines a front support surface for a flight 56. The paddle plate 118 is provided with a series of spaced apart apertures 120 for receiving fasteners to secure a flight 56 to the support surface. The paddle plate 118 also includes rearwardly extending support structure 122 which extends integrally from the backwardly facing surface of the plate 118 to the top of each sidebar 66, 68.

As previously noted above, the invention also pertains to the particular method of investment casting the stainless steel chain link 64 as well as the attachment link 114. The links 64, 114 are uniquely cast using an innovative modification of a conventional investment or lost wax casting procedure.

In a conventional investment casting procedure, a metal die of aluminum is machined and milled to form a negative or female cavity of the part to be made. Heated wax is then injected into the metal die forming a replica of the part. One or more wax replicas or patterns are assembled to a "tree" or feeder system having a number of gates and feeder tubes. The wax pattern assembly on the tree is then dipped in a slurry (a mix of colloidal silica flour and colloidal silica) having a viscosity similar to a 40 weight oil, drained and dusted with various colloidal silica sands. Additional dipping layers are added as needed over the course of several days of drying to contain the pouring weight of the molten metal used in the finished product and to produce a series of ceramic shells on the wax patterns. The slurry and sand combination is commonly known as the "investment". The investment or ceramic shells containing the wax are placed in an autoclave or pressurized steam vessel, wherein the wax is melted and eliminated from the ceramic shells to leave a number of ceramic molds. The ceramic molds are then fired in a special oven at around 1,800 degrees F. to cure the molds for the pouring of the molten metal. Molten metal at carefully controlled temperatures above 2,500 degrees F. is poured into the feeder system for delivery to the cured and heated ceramic molds to produce a tree of castings identical in size and shape to the original wax pattern. After a sufficient cooling period, the ceramic shells are broken or washed away from the castings. Lastly, each casting is cut away from the tree and proceeds to grinding, and cleaning prior to inspection and shipment.

The ceramic mold used in the conventional investment casting process has a low permeability compared to coarse grain sand cast molds, and retains heat for a significant period of time. This heat retention causes serious problems in shrinkage, warping and metal solidification (chilling) on parts with holes and cores. In the past, holes have been omitted and subsequently machined, or metal feeds have been added to eliminate the shrink around holes. These added feeds cause dimensional variances which require subsequent straightening and added gate removal and wax assembly costs.

In initial tests of investment cast chain links, the conventional casting method yielded a finished product that was defective in terms of uniform material strength and component tolerances. This method created stress risers and heat concentrations in the chain link sidebars 66, 68 within and about the chain bosses 74, 76 and barrel 86 that caused the chain 36 to fail the ultimate strength tests and cause the sidebars 66, 68 to warp during the cooling or solidification process.

To eliminate the heat retention problem discussed above, the inventors created hollow cores during the mold building process. It is a key feature of the casting process that the ends of the cores are masked off at a certain point in the mold building process to prevent any further ceramic buildup in the cores. The masking is accomplished preferably by using wax paper or any flammable element that will combust and burn away in the subsequent ceramic curing process. As an alternate, a preformed hollow ceramic core can be placed into the aluminum mold in place of the aluminum cores. This process continues injecting was around the ceramic preformed hollow core and then removes the wax pattern with the preformed ceramic core from the metal die. The hollow ends of the preformed hollow ceramic are masked off before forming the ceramic mold. After the masking, the remainder of the ceramic mold building process is completed for sufficient strength to support the metal pour. The masking material burns out in the ceramic heating-curing process. Molten metal (i.e. stainless steel) is then poured into the ceramic assembly via a single gate. The hollow cores of the ceramic mold allow the heat for the molten metal to escape and the resulting casting cools (chills) in a predictable pattern allowing a finished link with shrinkless metal and consistent dimensions.

Further key features of the casting process include adding flow channels of a certain minimum size (approximately ⅜ inch by ⅜ inch) to the sidebar channels of the ceramic mold, and injecting molten metal (stainless steel) into the mold from a gate in one direction. These features eliminated most of the problems associated with casting the stainless steel chain link 64. The flow channels run longitudinally through both chain sidebars 66, 68 from the closed end of the link 64 to the open end of the link 64.

These flow channels allow the molten stainless steel to flow rapidly and uniformly through the mold in a single direction. This unidirectional flow pattern results in a linear grain structure that is parallel, not transverse, to the length of the chain sidebars, maximizing material strength. They provide additional mass to the sidebars 66, 68 to retain heat and slow the cooling process. They provide a cooling vane to evenly and uniformly cool the center and entire length of the chain link to further preclude warping and shrinkage. The additional material mass provides dimensional stability and strength to the link material as it cools to also prevent warping and shrinkage. The additional flow channels in the link 64 along the length of the sidebars 66, 68 results in the reinforcing ribs 98, 100 when the metal cools. As previously noted, the ribs 98, 100 reduce the concentration of stress risers that cause premature failure when higher working and shock loads are applied to the chain link 64. The addition of the reinforcing ribs 98, 100 results in a 50 percent greater ultimate pull strength than all previous chain designs. Conventional cast chains have only offered small reinforcements (one inch or less) at the ends of the chain link 64.

Another key feature of the casting process involves the use of 316 stainless steel alloy as the molten metal poured into the ceramic mold. In general, the stainless steel alloy has the following composition in weight by percentage chromium 16%
nickel 12%
manganese 2%
molybdenum 2%
silicon 0.75%
copper 0.5%
carbon 0.08%
phosphorous 0.04%
sulfur 0.03%
iron (balance)

316 stainless steel alloy offers superior strength and abrasion resistance when compared to all other chain materials used in water and wastewater treatment. With 316 stainless steel alloy, the linear close grain, isotropic machining grade metal structure yields an ultimate pull strength of over 60,000 pounds and a rated working load of over 6,000 pounds per strand. In addition, cast 316 stainless steel alloys are 17 points harder on the Brinnell scale then conventional cast steel chain. Notably, 316 stainless steel alloy provides unparalleled corrosion resistance to all major chemical and biological elements found in wastewater.

In the past, engineers and manufacturers had to use different chain types and styles to accommodate a required increase in working load and ultimate strength beyond that offered by conventional cast or fabricated chain. Bigger and heavier cast steel chain link and sprocket designs, often with larger diameter and longer chain barrels, thicker and wider chain sidebars, larger diameter and longer chain pins had to be used to obtain these features. With the perfection of the investment casting process for stainless steel chain, it now becomes possible to increase the corrosion and abrasion resistance, ultimate strength and working load of the chain by manipulating the chain alloys, rather than increasing the dimensional size of the chain link. For specific severe duty and extreme duty applications, for example, the link and/or pin can be cast from 15–5 pH stainless steel and heat treated for a working load of 10,000 pounds, and an ultimate strength of over 100,000 pounds. All other stainless steel alloys, including Austinetic, Martensitic and Metastable Austinetic alloys and titanium, can be used with the same chain mold and manufacturing process to achieve the desired strength, working load and corrosion resistance for any application while still using the same chain link design.

Figure 8:
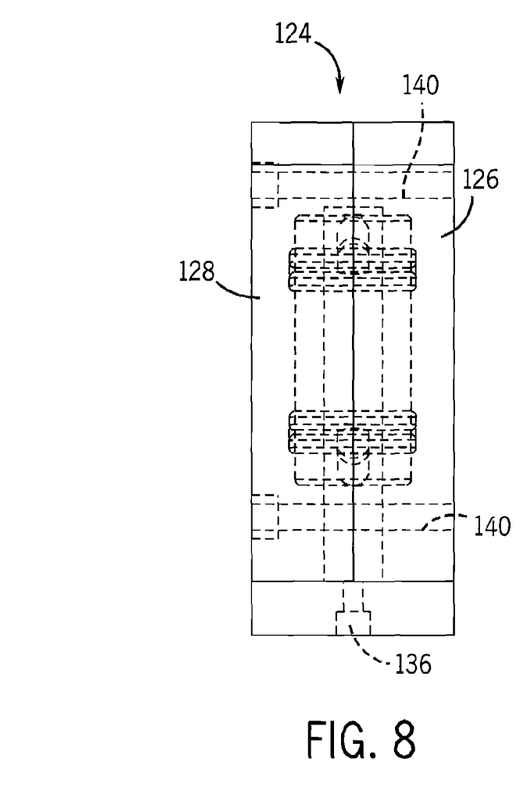
FIG. 8 is an end view taken from the left side of FIG. 7 with the gate removed.
Figure 9:
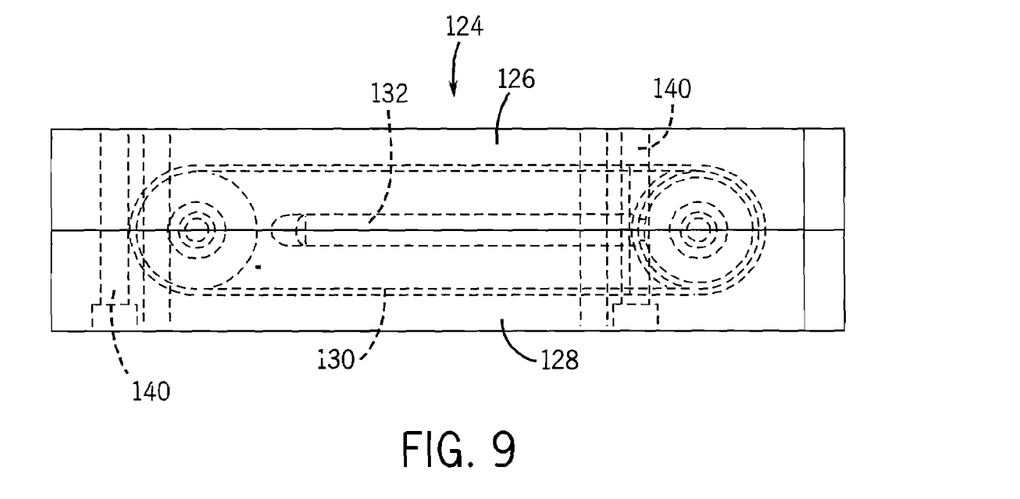
FIGS. 9 and 10 are respective views taken from the top and bottom of FIG. 7 with the gate removed.
Figure 10:
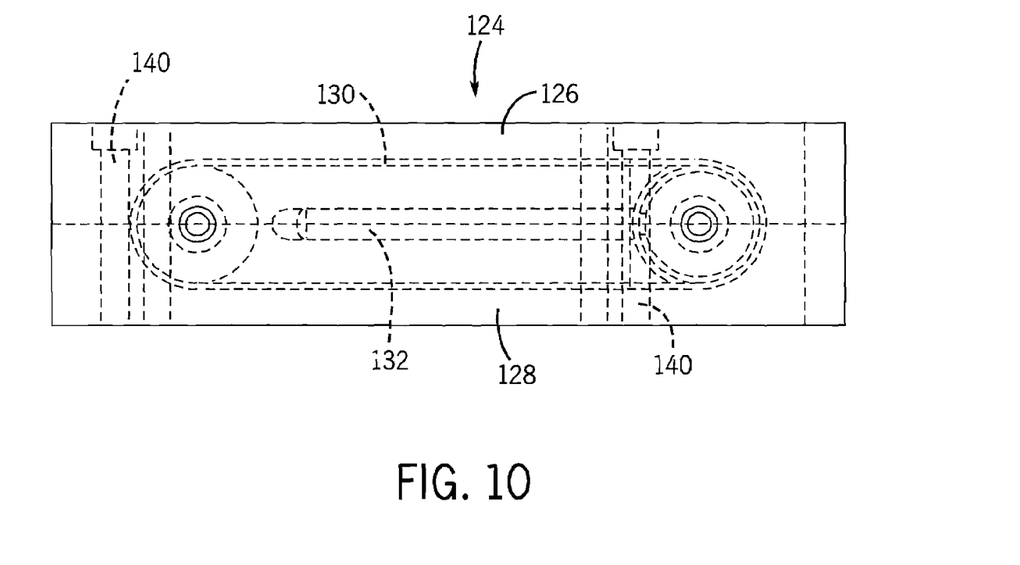
Figure 12:
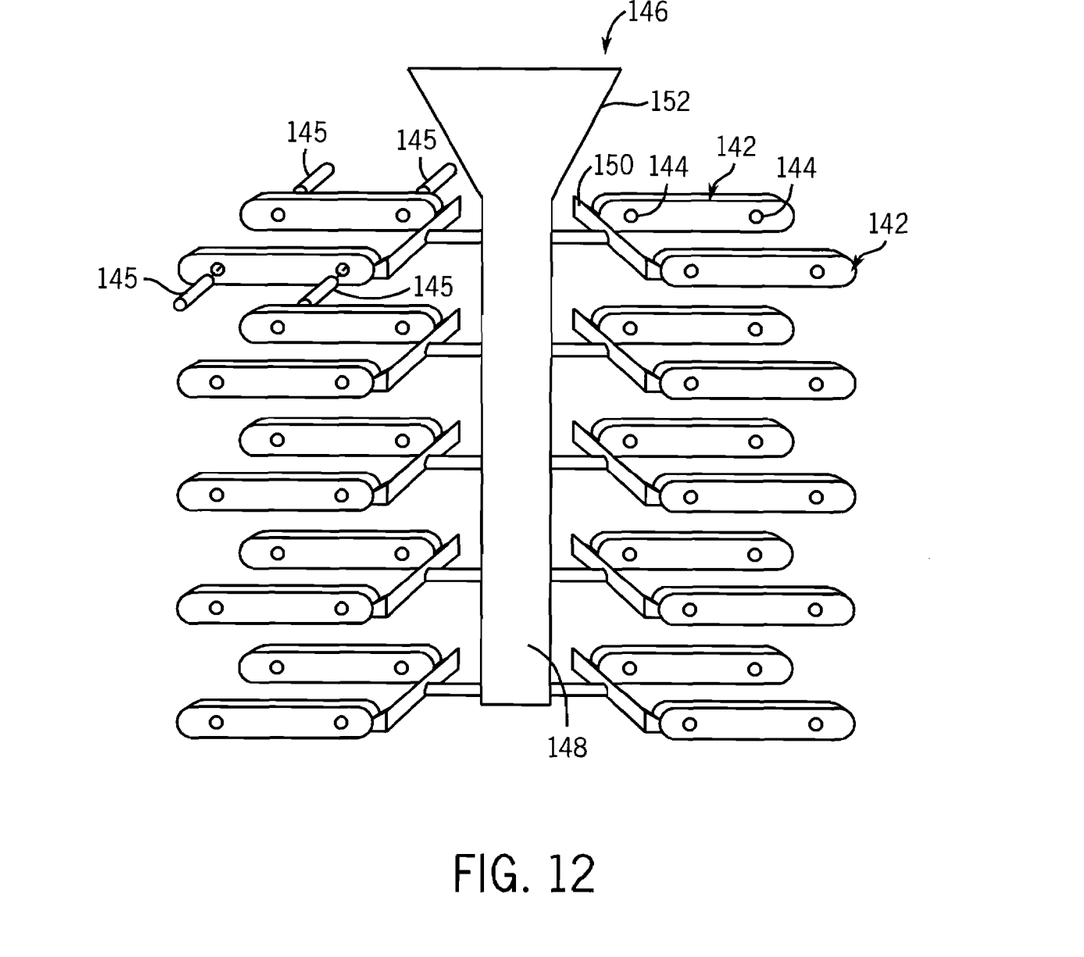
FIG. 12 is a front view of a number of wax patterns assembled on a feeder system.

In carrying out the specific method of investment casting the stainless steel chain link 64, the first step involves providing a metal die 124 (FIGS. 7–10) having superposed upper and lower halves 126, 128 milled and machined with mating negative cavities of the chain link 64 to be made. The dotted lines 130 in FIGS. 7–10 indicate the various wax-receiving pathways including the unique flow channels 132 as described above which define the structure of the link 64. When the die halves 126, 128 are placed one on top of the other (FIG. 8), a pair of removable, aluminum cylindrical cores 134 is passed through the die 124 from one side thereof for alignment in the areas of the chain link 64 designated as the pin bores 78, 80 and barrel bore 88. Pathways 134 for the bores 78, 80 and 88 are formed around the aluminum cores 134. Suitable retaining means 136 are used to secure the aluminum cores 134 in place during wax injection. The halves 126, 128 are also formed with a gate 138 on one end in communication with the various wax-receiving pathways 130. A series of vertical rods 140 maintain the alignment of the die halves 126, 128. The second step comprises the injection of heated wax into the gate 138 of die 124 causing the flow of wax along the pathways 130 and flow channels 132 to form a wax pattern 142 (FIG. 12) or replica of the chain link 64. Once the wax pattern 142 or replica is formed, the aluminum cores 134 are removed from the die 124 to leave a finished wax pattern with hollow cores 144 corresponding to the pin bores 78, 80 and 88.

The third step involves assembling a plurality of wax patterns 142 on a feeder system or tree 146 (FIG. 12) having a feeder tube 148 with a series of gates 150 which feed the gates 138 of wax patterns 142. The feeder tube 148 includes a cup 152 at one end thereof for a purpose to be explained below.

The fourth step relates to the sequential dipping of the entire wax assembly or tree 146 in a slurry (a mix of ground silica and colloidal silica), draining the slurry and then aerating or dusting various silica sands thereon. During the dipping process, each wax pattern 142 is coated inside and out causing a partial build up of investment (slurry and sand) on the inside of each hollow core 144. After each dipping process, the tree is allowed a sufficient drying period. Once three separate dipping sequences or investments have occurred, according to the invention, the hollow cores 144 are masked or plugged preferably with wax 145 (FIG. 12) or another suitable heat dispersing element to prevent further build up of investment material in the cores 144. Then, the dipping process resumes for several further sequences of dipping draining, sanding and drying. The completed dipping process creates a ceramic shell around each wax pattern 142.

Figure 13:
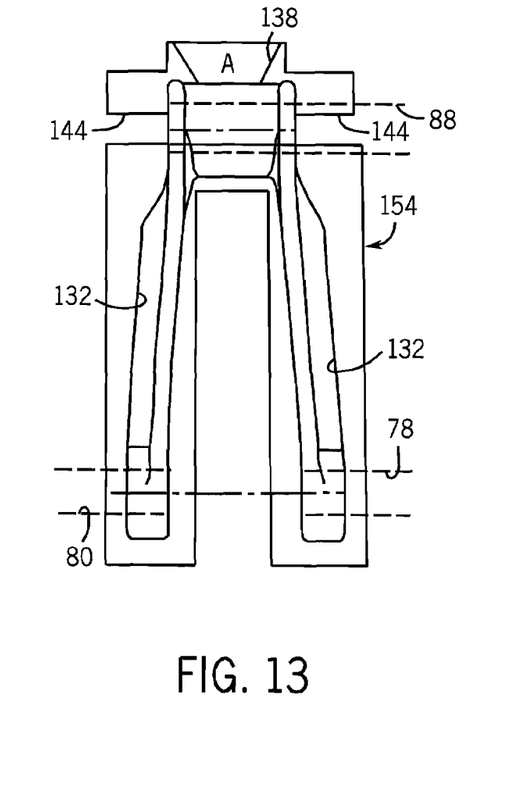
FIG. 13 is a top view of a ceramic mold used in the investment casting of the chain links of FIG. 2.
Figure 14:
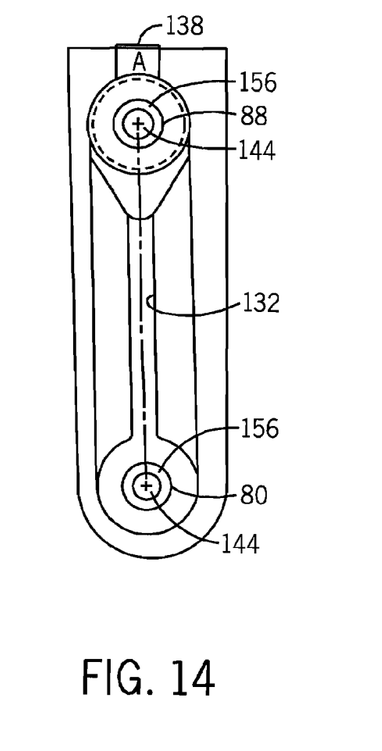
FIG. 14 is a view from the left side of FIG. 12.

In a fifth step, the tree 146 of ceramic-coated wax patterns 142 is inverted and placed in an autoclave wherein the wax is melted and eliminated by a means of the feeder tube 148 and the cup 152. The resulting products on the tree 146 are now transformed into ceramic molds 154, one being shown in FIGS. 13 and 14. At this point, the ceramic molds 154 are "green" or in a raw, untreated form having little strength.

During a sixth step, the tree 146 is moved into a gas oven where the ceramic molds 154 are fired (heated and cured) at about 1,800 degrees F. for about 2–3 hours. During the heating and curing, the wax or other heat dispersing element 145 plugging the hollow cores 144 is burned up and removed according to the invention. When the ceramic molds 154 are taken out of the oven, they are transported to a pouring table with the tree 146 upright. The ceramic molds 154 are now capable of withstanding temperatures of about 3,200 degrees F.

In the seventh step, 316 stainless steel alloy is induction melted in a furnace at a temperature of 2,850–3,000 degrees F. Generally, it has been found that about 500 pounds of alloy can be melted per hour. The molten stainless steel alloy is then transferred out of the furnace and poured into the cup 152 on tree 146 so that it can be fed to each ceramic mold 154 (FIG. 13) thereon. As noted above, the flow channels 132 and gate 138 permit the molten metal to flow rapidly and uniformly through the molds 154 in a single direction from end to another. After the molten stainless steel alloy is poured, the molds 154 sit overnight where they are slowly cooled (chilled) in a uniform, predictable manner as the molten metal heat escapes via the hollow cores 144 allowing a finished link 64 or 114 having shrinkless metal and consistent dimensions throughout. The metal material in the flow channels 132 provides a cooling vane along the entire length of the poured link to further preclude shrinkage and warping. The resulting reinforcing ribs 98, 100 reduce the concentration of stress risers that normally cause premature failure upon imposition of higher working and shock loads. It should be appreciated that the physical structure of these ribs 98, 100 result in 50 percent greater ultimate pull strength than all previous chain designs.

In the eighth step, once cooled, the ceramic molds 154 are washed or broken away, such as by the use of a jackhammer, from their hardened metal inserts to leave a series of stainless steel chain link castings. During this step, it should be understood that the coated investment portion 156 (FIG. 14) between the hollow cores 144 and the prescribed pin bores 78, 80, 88 breaks away leaving the resulting full bores 78, 80, 88.

In the final step, the individual castings or links 64, 114 are cut away from the tree 146 and proceed to grinding, and cleaning and assembly before inspection and shipment.

As an alternate, a preformed hollow ceramic core can be placed into the aluminum hole 140 (FIGS. 7 and 8) in place of the aluminum cores. This process contains injecting wax around the ceramic preformed hollow core and then removes the wax pattern with the preformed ceramic core from the metal die. The hollow ends of the preformed hollow ceramic are masked off before forming the ceramic mold. All subsequent steps will remain the same.

The present invention thus provides an investment cast stainless steel chain link having lateral reinforcing ribs running along substantially the full length of the chain link sidebars, and a rotating chain pin with a non-locking chain pin head. The chain link yields higher ultimate tensile pull strengths and eliminates most of the abrasive wear as the chain engages sprocket teeth that drive and carry the chain.

Due to the stainless steel alloy, sidebar and flow channels and heat dispersing elements used in the investment casting process to form the chain link, problems of corrosive attack, stress risers, heat concentrations, shrinkage and warping are virtually eliminated. In addition, the casting process produces a chain link having consistently close dimensional tolerances of plus or minus 0.010 inches between the chain pin and pin boss to preclude the entry of grit, sand and other abrasive particles in the chain joint reducing the rate of wear and extending chain link. Because of the close dimensional tolerances and smooth uniform component surfaces, there is no break-in or wear-in for the chain and no additional maintenances required in tensioning the chain. The investment casting process as perfected in the present invention enables the casting of multiple chain links as well as attachment links offering a dramatic savings in time and labor over the traditional one-at-a-time sand casting process. With the perfected casting process, it now becomes possible to customize chain links by manipulating their alloy content rather than by increasing the physical size of the chain link. The inventive chain link produced as a result of the unique investment casting process is designed to operate for a remarkable full 20 year service cycle (the current American water and wastewater industry process equipment design standard) without any replacement of either the chain or the sprockets.

The chain that has been developed and is proposed under this invention was designed to meet and exceed all standards for 700 Series offset sidebar pintle chains under American engineering standards particularly ASME B29.21 M-1996. However, the technology developed under this invention is also deserving of a protection as it applies to all other offset chain sidebar designs, including pintle, mill and drag chains where such chains are applied in severe duty and extreme duty corrosive conveyor, collector and elevator type equipment used in industry, food and agricultural applications.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:

1. A method for investment casting chain links comprising the steps of:
   a) providing a metal die having a cavity defining a chain link formed therein;
   b) injecting wax into the chain link cavity of the metal die to form a wax pattern having a pair of hollow cores that form pin bores in the chain link to be cast;
   c) assembling a plurality of wax patterns on a feeder system;
   d) sequentially forming an investment on each wax pattern on the feeder system at least three times;
   e) masking the hollow cores with a combustible heat dispersing element to prevent further investment build up on inside surfaces of the hollow cores;
   f) further sequentially forming investment on each wax pattern to form a ceramic shell around each wax pattern;
   g) placing the ceramic-coated wax patterns in a steam chamber to melt and eliminate the wax and form ceramic molds;
   h) heating and curing the ceramic molds in an oven while burning away and removing the heat dispersing elements from the hollow cores;
   i) pouring molten stainless steel alloy into the heated and cured ceramic molds;
   j) cooling the ceramic molds to solidify the stainless steel alloy therein;
   k) breaking away the ceramic molds to leave a series of castings defining stainless steel chain links; and
   l) cutting, grinding and finishing the castings to form completed chain links.

2. The method of claim 1, wherein the step of providing the metal die includes the step of providing aluminum cores.

3. The method of claim 2, wherein the step of injecting wax includes the step of removing the aluminum cores.

4. The method of claim 1, wherein the step of forming investment includes dipping and draining each wax pattern in a colloidal silica slurry and then dusting each wax pattern with a fine silica sand.

5. The method of claim 1, wherein the heat dispersing element is wax.

6. The method of claim 1, wherein the step of heating and curing the ceramic molds is performed at a temperature of at least 1,800 degrees F.

7. The method of claim 1, wherein the temperature of the molten stainless steel alloy is about 2,850–3,000 degrees F.

8. The method of claim 1, wherein the stainless steel alloy is formed with the following composition and weight by percentage:
- chromium 16%
- nickel 12%
- manganese 2%
- molybdenum 2%
- silicon 0.75%
- copper 0.5%
- carbon 0.08%
- phosphorus 0.04%
- sulfur 0.03% and
- iron for the balance.

9. The method of claim 1, wherein the step of providing a metal die includes the step of forming the chain link cavity with a gate at one end in communication with a pair of elongated flow channels running substantially along a length of the chain link to be cast on opposite sides thereof.

10. The method of claim 1, wherein the step of providing the metal die includes the step of placing preformed hollow ceramic cores into the metal die.

* * * * *